United States Patent
Liu et al.

(10) Patent No.: US 10,229,356 B1
(45) Date of Patent: Mar. 12, 2019

(54) ERROR TOLERANT NEURAL NETWORK MODEL COMPRESSION

(71) Applicant: Amazon Technologies, Inc., Seattle, WA (US)

(72) Inventors: Baiyang Liu, Issaquah, WA (US); Michael Reese Bastian, Bothell, WA (US); Bjorn Hoffmeister, Seattle, WA (US); Sankaran Panchapagesan, Mountain View, CA (US); Ariya Rastrow, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 517 days.

(21) Appl. No.: 14/581,969

(22) Filed: Dec. 23, 2014

(51) Int. Cl.
*G06N 3/08* (2006.01)

(52) U.S. Cl.
CPC .................................... *G06N 3/08* (2013.01)

(58) Field of Classification Search
None
See application file for complete search history.

(56) References Cited

PUBLICATIONS

Hinton et al. "Deep Neural Networks for Acoustic Modeling in Speech Recognition." Draft. Apr. 27, 2012. pp. 1-27.

Vincent Vanhoucke, Google, Inc.; Andrew Senior, Google, Inc.; and Mark Z. Mao, Google, Inc.. "Improving the speed of neural networks on CPUs." Deep Learning and Unsupervised Feature Learning Workshop, NIPS 2011 pp. 1-6.

Yun Xie, Department of Electronic Engineering, Tsinghua University, Beijing 100084, P.R. China and Marwan A. Jabri, School of Electrical Engineering, The University of Sydney, N.S.W. 2006, Australia. "Analysis of the Effects of Quantization in Multi-Layer Neural Networks Using Statistical Model." pp. 1-6 (appearing in IEEE Trans Neural Netw. 1992;3(2):334-8.).

*Primary Examiner* — Kakali Chaki
*Assistant Examiner* — Michael Zidanic
(74) *Attorney, Agent, or Firm* — Knobbe, Martens, Olson & Bear, LLP

(57) ABSTRACT

Features are disclosed for error tolerant model compression. Such features could be used to reduce the size of a deep neural network model including several hidden node layers. The size reduction in an error tolerant fashion ensures predictive applications relying on the model do not experience performance degradation due to model compression. Such predictive applications include automatic recognition of speech, image recognition, and recommendation engines. Partially quantized models are re-trained such that any degradation of accuracy is "trained out" of the model providing improved error tolerance with compression.

19 Claims, 7 Drawing Sheets

ERROR TOLERANT NEURAL NETWORK MODEL COMPRESSION

BACKGROUND

Computing devices can use models representing data relationships and patterns, such as functions, algorithms, systems, and the like, to process input (sometimes referred to as an input vector), and produce output (sometimes referred to as an output vector) that corresponds to the input in some way. In some implementations, a model is used to generate a likelihood or set of likelihoods that the input corresponds to a particular value. For example, artificial neural networks ("NNs"), including deep neural networks ("DNNs"), may be used to model speech such as via a NN-based acoustic model, predict the likelihood that a customer will purchase a product to determine what products should be recommended to the customer, recognize features included in an image such as faces or shapes, and the like. NN models can be useful for solving problems that are difficult to solve using rule-based models, such as pattern-recognition, speech processing, natural language understanding, face recognition, etc. The neural networks are artificial in the sense that they are computational entities implemented in hardware and, in some instances, software but mimic the biological neural networks in animals. The nodes of the artificial neural network compute an output based on one or more input values. When analogized to the nervous system, the inputs values mirror a stimulus while the output mirrors a response.

Scores in NN-based models are obtained by doing an NN forward pass. The forward pass involves multiplying large trained NN weight matrices, representing the parameters of the model, with vectors corresponding to feature vectors or hidden representations/nodes. The NN may progress from lower level structures to higher level structures. For example, for a NN trained to recognize faces in images, the input of the NN can comprise pixels. A lower level of the NN may recognize pixel edges, a higher level may identify parts of objects, such as eyes, noses, ears, etc., and an even higher level may recognize a face (or other object). In speech processing systems, NNs may generate scores, such as acoustic scores via the forward pass. In such implementations, the NN output can be used to determine which sub-word unit (such as a phoneme, phoneme portion, or triphone) is most likely to correspond to an input feature vector. The resulting models can be transmitted to recognition or prediction systems and used to predict one or more values for a user input such as an image or utterance.

The parameters of a model can be set in a process referred to as training. For example, a model can be trained using customer data that includes input data and the correct or preferred output of the model for the corresponding input data. The model can be used to process the input data, and the parameters of the model can be modified until the model produces (or "converges" on) the correct or preferred output. For instance, a correct output of an image recognition model would be the generating an output that identifies the subject included in the image.). This allows the model to evolve by adjusting the weight values to affect the output for one or more hidden nodes. The changing of weight values may be performed through a variety of methods such as random weight updates or backward propagation sometimes referred to as "back propagation". Back propagation includes comparing the expected model output with the obtained model output and then traversing the model to determine the difference between the expected node output that produces the expected model output and the actual node output. An amount of change for one or more of the weight values may be identified using this difference such that the model output more closely matches the expected output.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
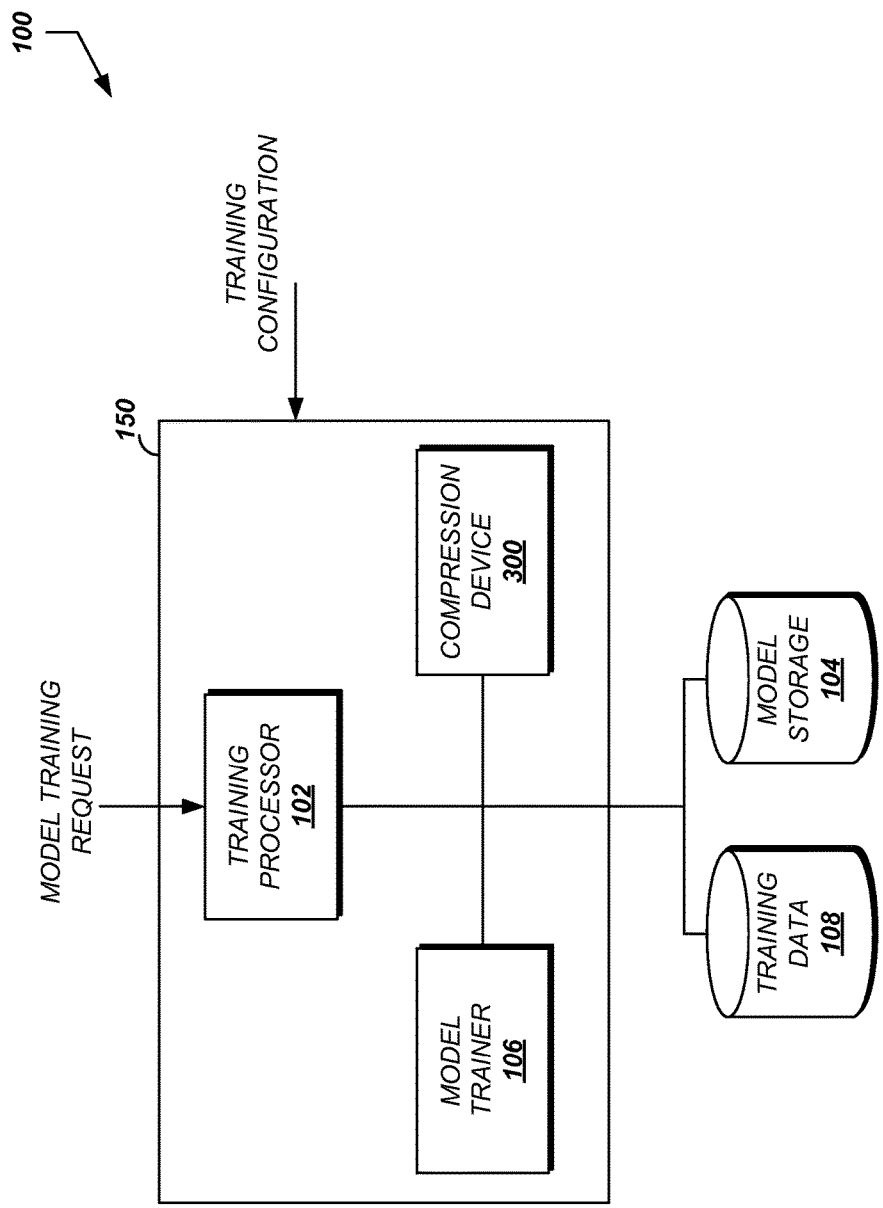
FIG. 1 shows a system diagram for an example error tolerant model training and compression system.

As noted above, deep neural network ("DNN") models may be used in many field, such as computer vision, speech recognition, natural language understanding. Generally described, artificial neural networks such as deep neural networks ("DNNs") have two or more layers of nodes, and nodes of adjacent layers may be connected to each other. Conceptually, the nodes may be thought of as calculating output values as a function of a plurality of different input values. Each connection between the various nodes of adjacent layers may be associated with a respective weight values. The weighting allows certain inputs to have a larger magnitude than others (e.g., an input value weighted by a 3× multiplier may be larger than if the input value was weighted by a 2× multiplier). This allows the model to evolve by adjusting the weight values for inputs to the node thereby affecting the output for one or more hidden nodes. In training the model, an optimal set of weight values are identified for each node that provides a model having, for example, a desired level of accuracy in generating expected outputs for a given set of inputs. When processing input data in the form of a vector such as one or more feature vectors containing information extracted from portions of the audio data, a neural network may multiply each input vector by a matrix representing the weights associated with connections between the input layer and the next layer, and then repeat the process for each subsequent layer of the neural network. For example, a neural network used in automatic speech recognition ("ASR") may contain several layers, including an input layer, an output layer, and any number of intermediate or "hidden" layers. Acoustic scores may be obtained by doing a forward pass. The forward pass involves multiplying the large weight matrices representing the connection weights between nodes of adjacent layers by vectors corresponding to one or more feature vectors (from the input layer) or hidden representations (from the subsequent hidden node layers). If some portion of the input data is corrupt, invalid, erroneous, inapplicable, or otherwise undesirable, conventional neural networks may nevertheless proceed to apply the weight matrices to the input and pass the results from one layer to the next, increasing the likelihood of producing inaccurate results.

One way to address these inaccuracies is through the use of back-propagation. Generally described, back-propagation refers to the process of updating the weights for the individual layers to improve accuracy of the neural network. Whereas forward pass involves taking the inputs and identifying weights that arrive at the desired outputs, back-propagation compares the output produced by a node with an expected output from the node. This difference can generally be referred to as a metric of "error." The difference of these two values may be used to identify weights that can be further updated for a node to more closely align the model result with the expected result.

The DNN forward pass computation can be resource intensive. Memory, power, network bandwidth, and processing bandwidth may be consumed during the training process.

Whether referencing the forward pass or the back-propagation, another way to improve the accuracy of the model is to increase the precision of the numeric representations for the weights. Floating point numbers can be used to convey more numerical information than fixed point numbers because floating point numbers to not fix the number of decimal places available for a number. Models which are trained using floating point numbers can therefore represent more states than a fixed point based model. However, the use of floating point numbers is accompanied by an increased resource utilization to maintain and process the numbers of higher precision. For example, the memory used to store the weights, the processor cycles needed to execute the instructions on floating point numbers, the power needed to drive the processor, or the transmission bandwidth needed to move the model to/from memory or a processing device may be at a higher level than models using smaller formats for numeric information.

Some training systems compress the model to facilitate efficient storage and transfer. One form of compression is to include a quantization step to reduce the amount of memory used for models trained using floating point numbers. When quantizing a model, the floating point weight values are quantized into weight values which require less memory to represent, such as fixed point or integers. The quantization process includes mapping a floating point number to a smaller representation. This mapping process may include removing decimal values from the floating point number, rounding the floating point number, format conversion from floating point to a less memory intensive format such as integer or fixed decimal, or saturating a given value such that the quantized result is limited to a fixed range. For example, if the upper limit of the fixed range is 100, if a value of 104.2024384 is received, the quantized saturated result would be 100. In some implementations, quantization may include identifying a set of quantized weight values. Each quantized weight value may represent a step or bucket into which weight values of a given range would be placed. In this way, the step or bucket identifier may be used to represent the uncompressed weight value. Because the number of steps or buckets is fixed, a value identifying a quantization step may be represented using less memory than the weight value. One way to identify a quantization step for a weight value is to find the range into which the weight falls. Another way is to identify a bucket having a lowest magnitude of difference from the weight as compared to any other quantized weight of the set of quantized weights.

Compression via rounding may include obtaining a rounding precision identifying a quantity of information to include in the compressed weight value. The quantity of information may be specified as a numeric type (e.g., floating point, integer, etc.). A compressed weight value may be generated using a weight value for an input of a node from a node layer. The generating may include adjusting the weight value to conform to the rounding precision. The adjustment may include truncating, rounding, or concatenating the weight value to achieve the desired precision.

In some implementations, the quantization may be a combination of these techniques such as adjusting the number of decimals or numeric format used to represent weights followed by range fixing. Quantization also provides a computationally simplified model which can be used by client systems, such as an ASR system, to obtain predictions more efficiently than an unquantized model.

Because the quantization process reduces the precision of the weights developed during training, the performance of the model may also be impacted. For example, to improve computation and resource efficiency, a DNN model trained with floating point weights may be quantized with fixed-point operations. The output from the quantized layers of the DNN model may be different from the unquantized DNN model with trained with floating point operation. In such circumstances, the input to the following layer will be different from what is expected during the training. This difference from the input can introduce error into the result from a given node. This node error may compound to larger error and manifest as a prediction error as the incremental errors for each node are accumulated through processing of the layers of non-linear operations from the input, through the hidden nodes, to an output.

In view of the constraints and limitations of NN model compression discussed above, improved devices and methods for error tolerant NN model compression are desirable. The error tolerance may be provided to allow a floating point DNN model to be compressed such that the precision of the model is higher than a conventionally quantized DNN model. Various aspects of the disclosure will now be described with regard to certain examples and embodiments, which are intended to illustrate but not limit the disclosure.

FIG. 1 shows a system diagram for an example error tolerant model training and compression system. The system 100 may be used to train and compress models, such as neural network models, to minimize prediction error due to compression. The system 100 includes a training system 150. The training system 150 shown in FIG. 1 is a simplified training system intended to highlight certain aspects of error tolerant model training and compression. The training system 150 may include addition elements including one or more of a power source, memory, a transmitter, a receiver, a transceiver, or a network interface to expand the capabilities of the training system 150.

The training system 150 includes a training processor 102. The training processor 102 is a specially configured processing device which coordinates the training and compression of models. The training processor 102 may be implemented as a circuit or as an electronic device configured to execute one or more instructions to perform the training and compression coordination described.

The training processor 102 may receive a training configuration message. The training configuration message may include an identification of a model to train. The identification may be a value which is associated with the model data stored in a model storage 104. If the model is not found in the model storage 104, the training processor 102 may be configured to create a new model using the provided identification information. In some implementations, the training configuration message may be included in the model training request. In such implementations, the device requesting the training can specify the parameters for training such as the desired accuracy or compression for the requested model.

The training system 150 may include a model trainer 106. The model trainer 106 is configured to train an identified model using an identified set of training data, such as digitized utterances from human speaker. The model trainer 106 may receive one or more messages identifying the model and data set for training. Once received, the model trainer 106 may be configured to obtain the identified model from the model storage 104. The model trainer 106 may also be configured to obtain the identified training data from a training data storage 108. The training data may include input values and expected output values.

The model trainer 106 may then iteratively perform neural network model training. During each iteration, the weights for each path between the nodes of the neural network may be adjusted. The adjustments may be based on the outputs of the model as compared with the expected output values. As the weights are adjusted, the outputs of the model may change. For some training data, the output for a given iteration may more closely resemble the expected output, while for other training data, the output for the iteration may be further from the expected output than a previous iteration. How closely the output for a given model matches the expected output may be referred to as the accuracy of the model.

The training configuration may identify a target accuracy. The target accuracy may indicate a performance metric for the model which, when met, is sufficient for the model's intended purpose. For example, it may be sufficient for an image detection model to have an output accuracy of 80% accurate. Accordingly, the model trainer 106 may terminate training of a model when the model can predict the output at 80% accuracy. In some instances, the training data used to train the model may be different than the data used to validate or otherwise test the accuracy of the model. The validation data may be stored in the training data storage 108. The termination may occur after completion of a number of training iterations. For example, if the model trainer 106 performs 1000 iterations and has not reached the target accuracy, the model trainer 106 may be configured to terminate the training and indicate the final state of the training process. The final state may indicate the number of iteration limit was reached and the accuracy of the last iteration.

The model trainer 106 may store one or more of the trained model and iterations thereof in the model storage 104. Once the training process is complete, the model trainer 106 may transmit a message to the training processor 102 indicating the training process for the identified model is complete. The message may include an identifier for the trained model. The identifier facilitates retrieval of the trained model from the model storage 104. If the message indicates that the termination was completed without reaching a target accuracy, the training processor 102 may be configured to restart or resume the training process. The decision may include assessing the resources available to the training system 150 whereby if a predetermined quantity of resources is available, the training process may be restarted or resumed. Restarting may include selecting new initial weights for the model and initiating the training. Resuming may include causing the model trainer 106 to continue training the model for an additional number of iterations or until the model is sufficiently accurate.

At this point in the process of training the model, the training system 150 has not lost fidelity in the weights included in the model. That is, the trained model has been generated using full numerical representations. Accordingly, the performance of the trained model is not impacted by rounding or quantization errors.

In the case where the model is sufficiently accurate, the training processor 102 may transmit a message to a compression device 300. The message may include an identifier for the model to be compressed. The compression device 300 may retrieve at least a portion of the model from the model storage 104. Once obtained, the compression device 300 may be configured to compress the model. The model compression performed by the compression device 300 includes selecting one layer of the model for quantization. Once the selected layer is quantized, the following layers may be trained, such as via the model trainer 106. The training may include back-propagation updating of the unquantized weights. If the resulting model is sufficiently compressed, the compression device 300 may transmit a message to the training processor 102 indicating the compression of the model is complete. The sufficiency of the compression may be determined by a threshold included in the training configuration. The threshold may identify one or more required resource quantities for storing or using the model. Such resource requirements may include an amount of memory used to store or transmit the model, an amount of bandwidth needed to transmit the model to a target destination via a specified communication link, an amount of processing used to obtain a prediction from the model, an amount of memory used to obtain a prediction from the model, or an amount of time taken to obtain a prediction from the neural network model. The threshold may identify a compression ratio for the model indicating a degree of compression between the uncompressed version of the model and the compressed version of the model. If the model is not sufficiently compressed, the compression device 300 may select another layer of the model and repeat the quantization and training process until either the compression is deemed sufficient or all layers are trained with previous layers quantized. Further details of the structure and functions of the compression device 300 are provided below.

The training processor 102 may transmit a model training response once the model is trained and compressed. If the model was not trained to the specified degree of accuracy, the response may include information identifying such circumstances. If the model was not compressed to the specified degree, the response may alternatively or in addition include information identifying such circumstances.

Figure 2A:
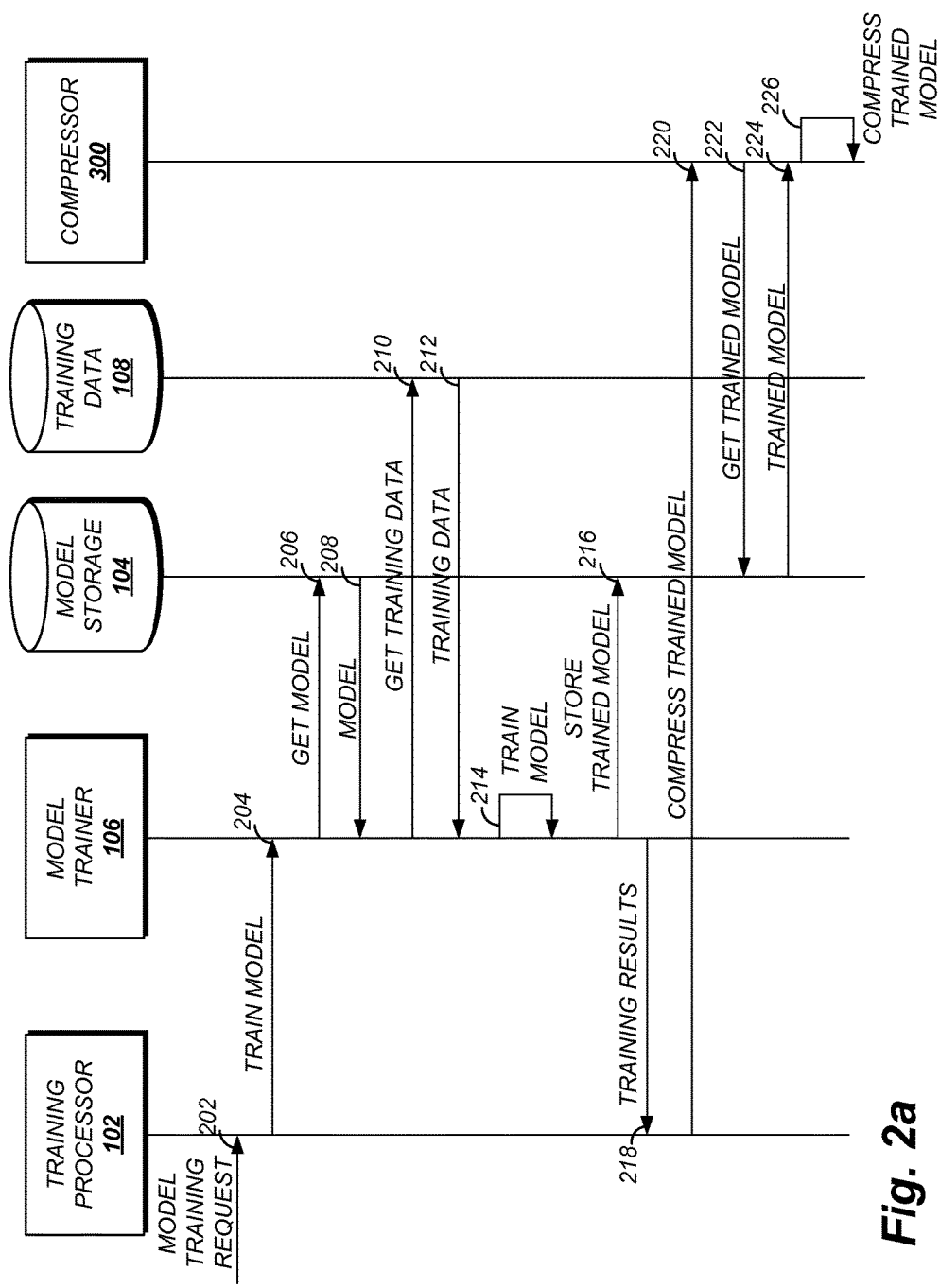
FIGS. 2a and 2b show a message flow diagram of an example training process with error tolerant compression.
Figure 2B:
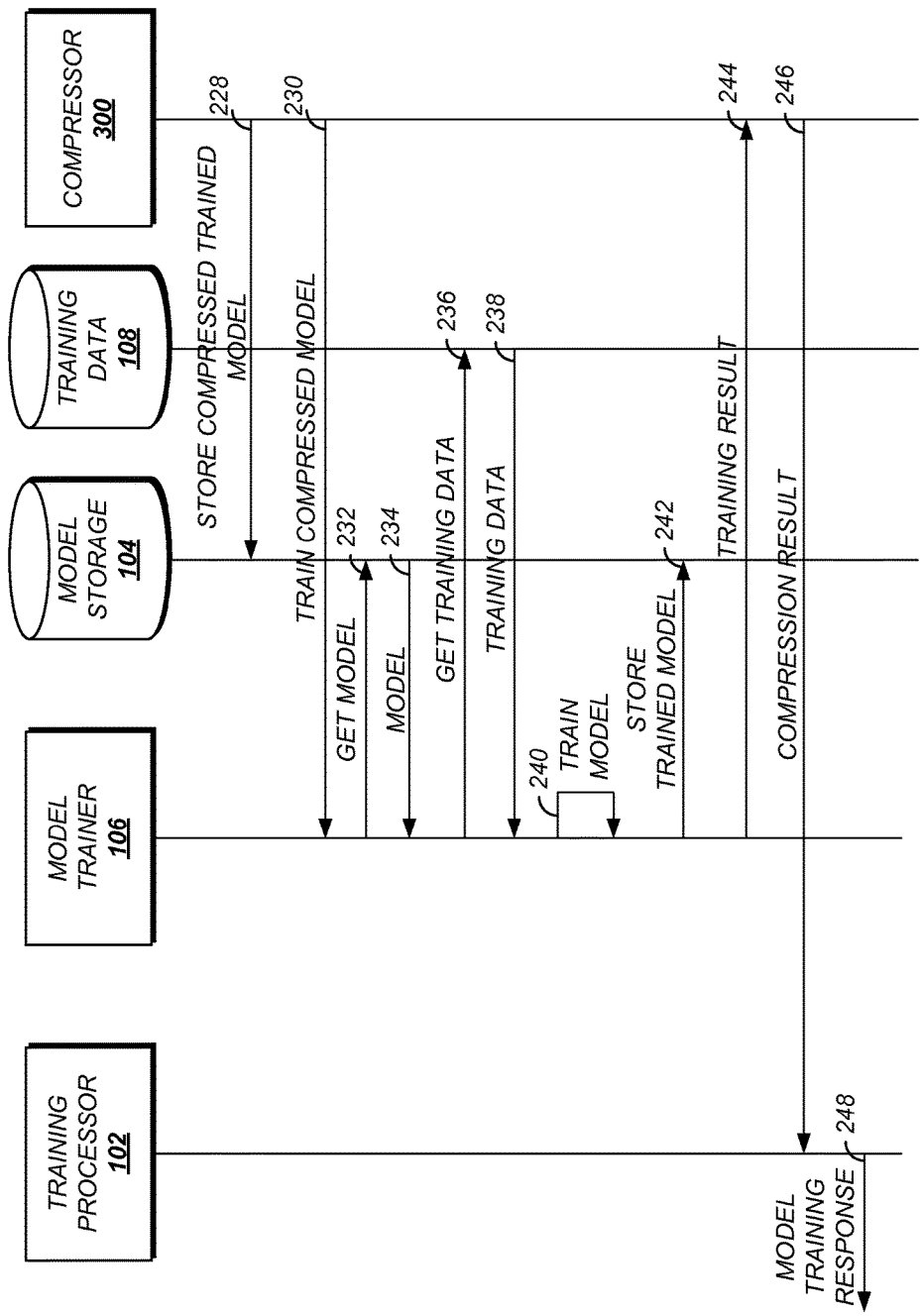

FIGS. 2a and 2b show a message flow diagram of an example training process with error tolerant compression. The message flow of FIGS. 2a and 2b show messages exchanged between several entities which can be included in an error tolerant training and compression system. For ease of explanation, the number of entities shown has been limited. However, it will be understood that additional entities can be added or multiple entities combined consistent with the description herein.

The features described provide error tolerant model compression. Such features could be used to reduce the size of a deep neural network model including several hidden node layers whereby each hidden node layer includes one or more hidden nodes. The size reduction in an error tolerant fashion ensures predictive applications relying on the model do not experience performance degradation due to model compression. Such predictive applications include automatic recognition of speech, image recognition, and recommendation engines. Partially quantized models are re-trained such that any degradation of accuracy is "trained out" of the model providing improved error tolerance with compression. The message flow of FIGS. 2a and 2b illustrate one implementation of such features.

Message 202 is received by the training processor 102. The message 202 is a model training request message. The message 202 may include an identifier for a model to be trained. The message 202 may include training configuration information such as a desired accuracy, desired compression, training data set or an identifier for a training data set, validation data or an identifier for a validation data set, or destination address to which the result of the training should be transmitted.

The training processor 102 transmits a message 204 to the model trainer 106. The message 204 indicates the model to be trained by the model trainer 106 and any configurations for the training such as those discussed above.

The model trainer 106 is configured to generate and transmit a message 206 to the model storage 104. The message 206 includes an identifier for the model to be trained. The model storage 104 transmits a response message 208 including at least a portion of the model information.

The model trainer 106 is further configured to generate and transmit a message 210 to the training data storage 108. The message 210 includes an identifier for the training data for training the identified model. At least a portion of the training data is transmitted from the training data storage 108 to the model trainer 106 via a message 212.

Having obtained the model and the training data, the model trainer 106 via messaging 214 trains the model. The training may be achieved through forward and/or backward propagation methods. The training, as discussed above, includes adjusting the weights for the pathways between nodes at different layers of the model. The training may continue until a termination condition is reached. As noted above, the termination condition may include one or more of a number of training iterations, an accuracy of the model, or a metric generated using one or more of these values.

Message 216 is generated and transmitted from model trainer 106 to model storage 104 to store the trained model upon attainment of a termination condition. A message 218 may also be generated by the model trainer 106 and transmitted to the training processor 102. The message 218 may include information indicating the result of the training process. For example, the message 218 may indicate the training completed at the requested accuracy. If the training terminated before reaching the desired accuracy, the message 218 may include information indicating the failure and, in some implementations, the highest accuracy attained.

If the model did not reach the requested accuracy, messaging 204 through 218 may be repeated. For purposes of illustration, as shown in FIG. 2a, it is assumed that the model attained the desired accuracy. Having a suitably accurate model, the training processor 102 may then proceed to transmit a message 220 to the compressor 300. The message 220 may include an identification of the model to be compressed. The message 220 may include additional training configuration information such as a desired accuracy, desired compression, training data set or an identifier for a training data set, validation data or an identifier for a validation data set, or a compression method. The compression method may include one or more of: quantization configuration, layer selection method, or a compression termination condition. The quantization configuration may include quantization ranges or quantization number format such as number of fixed points in a fixed point decimal. The quantization configuration may be specified for the model as a whole or indicated for each layer of the model. The layer selection methods may include lowest layer first where the lowest layer is the first layer to receive the input vectors. The lowest layer may be the uncompressed model layer to generate an output value before any other unquantized model layer. The selection may use the highest layer where the highest layer is the uncompressed model layer preceding the output values (e.g., an unquantized model layer that generates an output value after all other unquantized model layers have generated output values). In some instances, the layer selection method may be dynamic. For example, the layer selection may include identifying the layer which, if quantized, would most reduce the resource requirements to store, transmit, or use the model. The reduction may be relative to the resource requirements to store, transmit, or use the model if another layer were quantized or otherwise compressed. For example, a comparison of first resource requirements for storing or using compressed weight values for a first hidden node layer with second resource requirements for storing or using compressed weight values for a second hidden node layer may be performed. The comparison is then used to select the first hidden node layer as the hidden node layer when the first resource requirements are less than the second requirements. For example, a dynamic selection may include determining the layer including weights which require the most floating point numbers to compress first. The compression termination condition may include a target model resource consumption, a compression ratio, or a number of layers to compress.

In some implementations, the compression method may also indicate whether the compression method is to be performed via a fixed, static format or a dynamic, changing format. For example, if the compression method is quantization, the quantization parameters may be statically defined or dynamically assessed. In a statically defined implementation, the same quantization parameters may be applied for each model. In a dynamically assessed configuration, the quantization parameters may be determined on a model-by-model basis. For example, quantization parameters may be selected such that the resulting quantized model balances the resource requirements of the quantized model with the accuracy of the compressed model. As one example of a selection process, a table or other data structure for mapping quantization parameters to expected model prediction accuracies may be provided. As noted above, the compression request may include a target accuracy for predictions generated by the model. In such implementations, the selection includes comparing the target accuracy for the model with the expected accuracies in the data structure. The comparison may be an exact match, where the selection identifies the entry in the data structure which includes the target accuracy value as the expected accuracy. In some implementations, the data structure may include incremental expected accuracies. In such implementations, the entry associated with the expected accuracy having the lowest difference from the target accuracy may be selected.

In some implementations, the selecting may include weighing two or more compression methods. The selection may be performed by the compressor 300 to identify an "optimal" set of quantization parameters. The optimal set of parameters may be identified as the set of parameters providing a compressed model having the highest accuracy, the highest resource savings as compared to the original model, or a combination of both. For example, the compressor 300 may perform multiple compressions for the model using different parameters. Each of the compressed models has an accuracy and resource requirements. The compressor 300 may then select the model having the highest accuracy, the highest resource savings as compared to the original uncompressed model, or a combination of both for further processing.

Another aspect of the compression method that may be specified statically or dynamically is the number of bits used to represent the weights for the model. As discussed above, the hidden nodes of a neural network model may include paths. Paths may be associated with a weight value indicating whether a particular path is to be followed within the network model. The weight values are stored in computer memory. To store a value, a number of bits may be allocated to each value. In a static configuration, the weights may be compressed such that the model stores weight values using a predetermined number of bits such as 4 or 8 bits. In a dynamic configuration, the compressor 300 may generate two or more compressed models using different bit lengths and select one of the compressed models with the highest accuracy. In some implementations, the selection of multiple models may weigh two or more different selection criteria (e.g., accuracy, resource requirement). For example, in a mobile implementation, it may be desirable to sacrifice accuracy in favor of compression due to the resource limitations generally associated with mobile devices. As such, the selection may consider a score determined by one or more resource characteristic for the model and the model's accuracy. For mobile implementations, a higher score may be associated with resource efficient model. As such, the resource characteristics may be weighted more than the accuracy for these mobile embodiments. The weighing of may be implemented to select other aspects of the compression method such as the quantization parameters for quantization compression or the number of decimal places for rounding compression.

Having received a request to compress a specific model, the compressor 300 may transmit a message 222 to the model storage 104 to obtain the trained model to be compressed. Message 224 provides at least a portion of the trained model to the compressor 300. Messaging 226 is performed by the compressor 300 to compress a layer of the model.

Turning to FIG. 2b, via message 228, the compressor 300 stores the compressed trained model in the model storage 104. The compressor 300 may then initiate training of the compressed model via message 230. As shown in FIG. 2b, the model trainer 106 may be utilized to train the compressed model. In such an implementation, the message 230 may include an identifier for the compressed model and, in some implementations, training configuration information such as discussed with reference to message 204. The training may include adjusting weight values for inputs to nodes in the model such that, after adjustment, the model has a higher accuracy than the model prior to adjustment. Higher accuracy model may generally refer to a model which predicts more elements of a training data set than another.

Messages 232 through 244 are similar to messages 206 through 218. Instead of the model trainer 106 interacting with the training processor 102, in the messages 232 through 244, the model trainer 106 interacts with the compressor 300.

The message 244 is generated by the model trainer 106 and transmitted to the compressor. The message 244 includes information indicating the result of the training process. For example, the message 244 may indicate the training completed at the requested accuracy. If the training terminated before reaching the desired accuracy, the message 244 may include information indicating the failure and, in some implementations, the highest accuracy attained.

If the model did not reach the requested accuracy, messaging 232 through 244 may be repeated. For purposes of illustration, as shown in FIG. 2b, it is assumed that the compressed trained model has attained the desired accuracy.

At this point in the message flow, the model has been trained, one layer compressed, and trained again. If the model was not sufficiently compressed, messaging 222 through 244 may be repeated until a compression termination condition is met. The sufficiency may be judged by the compressor 300 using the compression configuration, such as that received from the training processor 102. For purposes of illustration, as shown in FIG. 2b, it is assumed that the compressed trained model has attained the desired compression level.

Message 246 may include information indicating the result of the compression process. For example, the message 246 may indicate the compression completed at the requested compression level. If the compression terminated before reaching the desired level, the message 246 may include information indicating the failure and, in some implementations, the degree of compression achieved. Message 248 may be transmitted from the training processor 102 to indicate the result of the training and compression. The message may include an identifier for the final compressed and trained model. The message 248 may include additional information about the training or compression process such as the number of iterations, compression level, accuracy, and model resource consumption.

Figure 3:
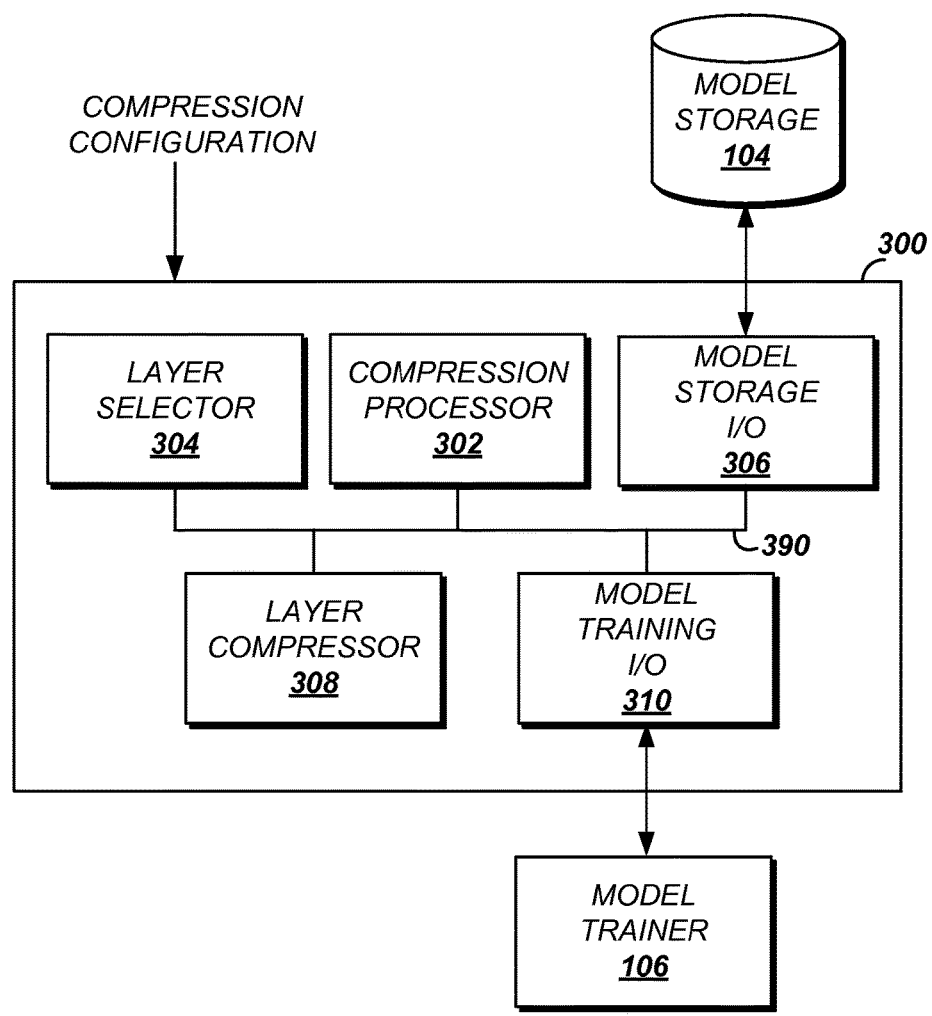
FIG. 3 shows a functional block diagram of an error tolerant neural network compression device.

FIG. 3 shows a functional block diagram of an error tolerant neural network compression device. The compressor 300 may be configured to implement the error tolerant neural network compression features described in this application.

The compressor 300 includes a compression processor 302. The compression processor 302 is a specially configured processing device configured to coordinate the compression of an identified model. The model to be compressed may be identified via a compression configuration received by the compressor 300. The compression configuration may include one or more of a desired accuracy, desired compression, training data set or an identifier for a training data set, validation data or an identifier for a validation data set, or a compression method. The compression processor 302 may be implemented as a circuit or as an electronic device configured to execute one or more instructions to perform the compression described.

The compression processor 302 may detect receipt of a compression request. The compression request may be received from the training processor 102. In some implementations, the compressor 300 may be included in an existing model training system. In such implementations, the compressor 300 may be configured to interface with the existing training system to provide the additional compression features discussed herein. In such implementations, the compression processor 302 may receive a message indicating the termination of training for a model and initiate the compression. This facilitates the provision of compression features to existing systems in an efficient manner since the compressor 300 can intercept existing model training information to provide new capabilities.

The compression processor 302 may be configured to transmit a message to a layer selector module 304. The message received by the layer selector module 304 may include an identification of the model to be compressed and a layer selection method. The layer selector module 304 may obtain at least a portion of the model via a model storage input/output module 306. The model storage input/output module 306 is configured to receive a model identifier and transmit a request for model information from the model storage 104. In response, the model storage 104 may provide the requested model information.

Having obtained model information, the layer selector module 304 may be further configured to identify a candidate layer for compression. As discussed, the layer selection methods may include lowest layer first where the lowest layer is the first layer to receive the input vectors or highest layer first where the highest layer is the model layer preceding the output values. In some instances, the layer selection method may be dynamic. For example, the layer selection may include identifying the layer which, if quantized, would most reduce the resource requirements to store, transmit, or use the model. Such dynamic selection may include determining the layer including weights which require the most floating point numbers to compress first. The compression termination condition may include a target model resource consumption, a compression ratio, or a number of layers to compress.

A layer compressor 308 may be included in the compressor 300 to compress the layer identified by the layer selector module 304. The layer compressor 308 may receive pointers to the model and layer to be compressed such as identifiers. In some implementations, the layer compressor 308 may be provided the weights to be compressed. The layer compressor 308 may also receive compression configuration information, such as that described above.

The layer compressor 308 may be configured to apply the compression method indicated in the compression configuration. In some implementations, a default compression method may be specified for the layer compressor 308. The default compression method may be applied in the absence of any specified compression method. Application of the compression by the layer compressor 308 causes the layer compressor 307 to generate compressed weight values for the one or more input values of nodes included in the candidate node layer by compressing the respective weight values for the nodes included in the candidate node layer.

Once the layer weights are compressed, the layer compressor 308 may be configured to store the compressed weights in the model storage 104 via the model storage input/output module 306. The compressed weights may be stored in a copy of the identified model. For example, the layer compressor 308 may be configured to generate a compressed model by replacing the respective weight values with the compressed weight values for nodes included in the candidate node layer, the compressed model having a second required resource quantity to store or use the compressed model that is less than the first required resource quantity. By maintaining the uncompressed model and the copy, a comparison with the uncompressed model can be performed to identify the degree of compression achieved, such as for determining whether a compression termination condition is met.

Having compressed a layer of the model, the layer compressor 308 may transmit a message to the compression processor 302 indicating the model and layer which was compressed. The message may include an identifier for the model and, in some implementations, the layer compressed. It may be desirable to also provide compression statistics in the message. These statistics may include resource usage, compression level, and the like. The statistics may be maintained by the compression processor 302 as factors influencing the overall compression process.

The compression processor 302 may transmit a message to cause the training of the compressed model. The message may be transmitted to the model trainer 106 via a model training input/output module 310. Although the same model trainer, model trainer 106, used to train the uncompressed model is shown as being the model trainer for the compressed model, it will be understood that a different model trainer may be used to train the compressed model. For example, if an automatic speech recognition system receives uncompressed models from a model provider, the ASR system may wish to perform customized compression of the model. Accordingly, the model trainer 106 may be different than the model trainer used to generate the provided, uncompressed, model.

Although a connection is not shown, the model trainer 106 may be configured to obtain the compressed model information from the model storage 104. The message initiating the training of the compressed model may also include training configuration information such information identifying the target accuracy, training data, verification data, and termination conditions. The compression processor 302 may receive the result of the from the model trainer 106 via the model training input/output module 210. As discussed above, the result may include a value identifying the trained model accuracy.

The compression processor 302 may be configured to determine whether additional compression is needed. The determination may identify the attainment of a compression termination condition specified in the compression configuration. In some implementations, if the compression level is insufficient, additional uncompressed layers may be compressed. In some implementations, if all layers have been compressed via a first method, a second pass may be performed. For example, the second pass may reduce the number of decimal places used for representing a weight value or narrow quantization ranges so as to reduce the amount of information included in the model.

If the model is compressed to the specified degree, the compression processor 302 may be configured to provide a result message. In some implementations, the result message may be provided to the device requesting the compression. In some implementations, the result message may be provided to a configured destination. For example, in an implementation where the compressor 300 is integrated into an existing system, the compression processor 302 may be configured to provide a result message to a downstream application such as a speech recognition system. In such implementations, the compressor 300 is configured to provide a compressed version of a model without the downstream application being made aware of the compression.

The elements of the compressor 300 are coupled by a bus 390. The bus 390 is configured to allow the elements to exchange data (such as the messages described herein) and/or power. In some implementations, parallel busses may be included, one for data and one for power.

In some implementations, the compressor 300 may include a computer-readable memory configured to store executable instructions. In such a configuration, the compressor 300 may further include a processor in data communication with the computer-readable memory. The processor may be programmed by the executable instructions to implement the features described.

Figure 4:
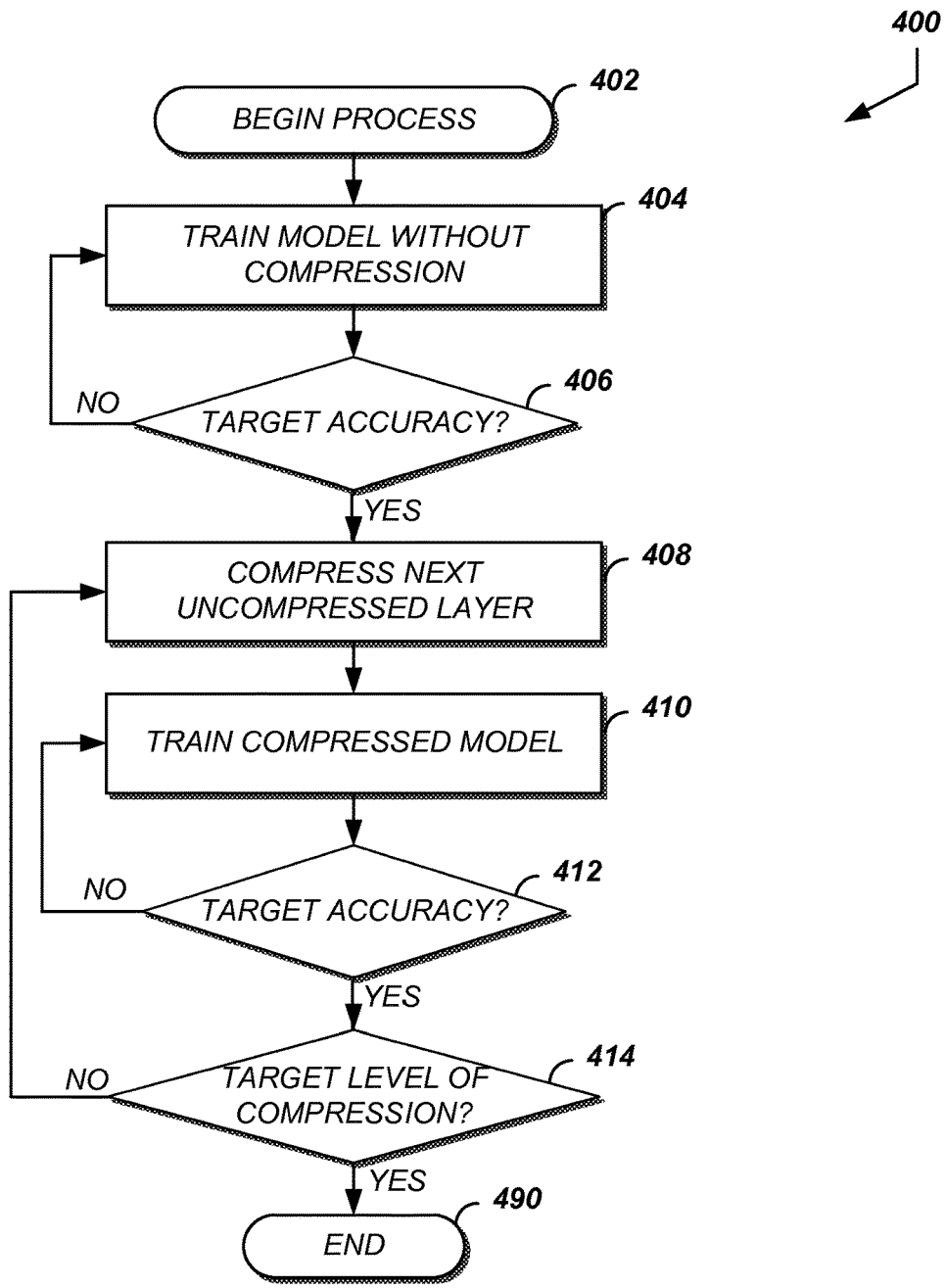
FIG. 4 shows a process flow diagram of a method for error tolerant model training and compression.

FIG. 4 shows a process flow diagram of a method for error tolerant model training and compression. The process 400 of FIG. 4 may be implemented in whole or in part by the compressor 300.

The process 400 begins at block 402 with the receipt of a model training request. The model training request includes information identifying a model for compression, such as discussed above with reference to FIG. 2*a*.

At block 404, the identified model is trained without compression. The training without compression includes maintaining the weights for the model using floating point numeric representations. As part of the training at block 404, there is no quantization of model data. The training at block 404 may be performed using a training data set. The training data set may be specified along with the model identifier. In some implementations, the process 400 may be tailored to a common purpose such as object recognition. As such, the same training data set may be used for training all models.

At decision block 406, a determination is made as to whether the model has attained a target accuracy. The target accuracy may be a static accuracy value. In some implementations, the target accuracy may be specified in the model request or via a training configuration. The target accuracy may be determined by comparing a value output from the training at block 404. The value may be a metric indicating the accuracy of the model at predicting the training data set. In some implementations, a separate validation data set may be used to generate an accuracy metric for the model. The validation data may be processed via the model and the output compared to the expected value.

If the determination at block 406 is negative, the process 400 may return to block 404 for further training. If the determination at block 406 is affirmative, the process 400 continues to block 408.

At block 408, the next uncompressed layer is compressed. The next layer may be identified via a layer selection method. The layer selection method may be statically defined for the process 400. In some implementations, the layer selection method may be specified along with the model identifier or as part of a configuration for the process 400. Block 408 may be configured to apply a compression method, such as quantization method. In some implementations, the compression may be dynamically performed. For example, each layer may be quantized using different quantization parameters. Accordingly, the determination of "next" and the compression applied may be dynamic.

At block 410, the compressed model is trained. The training at block 410 may be performed using the training data set used at block 404. As discussed, the training data set may be specified along with the model identifier. In some implementations, the process 400 may be tailored to a common purpose such as object recognition. As such, the same training data set may be used for training all models.

At decision block 412, a determination is made as to whether the compressed and trained model has attained a target accuracy. The target accuracy may be a static accuracy value. In some implementations, the target accuracy may be specified in the model request or via a training configuration. The target accuracy may be determined by comparing a value output from the training at block 410. The value may be a metric indicating the accuracy of the model at predicting the training data set. In some implementations, a separate validation data set may be used to generate an accuracy metric for the model. The validation data may be processed via the model and the output compared to the expected value.

If the determination at block 412 is negative, the process 400 may return to block 410 for further training. If the determination at block 412 is affirmative, the process 400 continues to decision block 414. At decision block 414, it is determined whether the compressed model has reached a target compression level. The target compression level may be specified in a compression configuration, statically defined for the process 400, or dynamically determined such as by identifying a target device or transmission medium for the model.

If the determination at block 414 is negative, the process 400 may return to block 408 to compress another layer and additional training. If the determination at block 414 is affirmative, the process 400 terminates at block 490.

Figure 5:
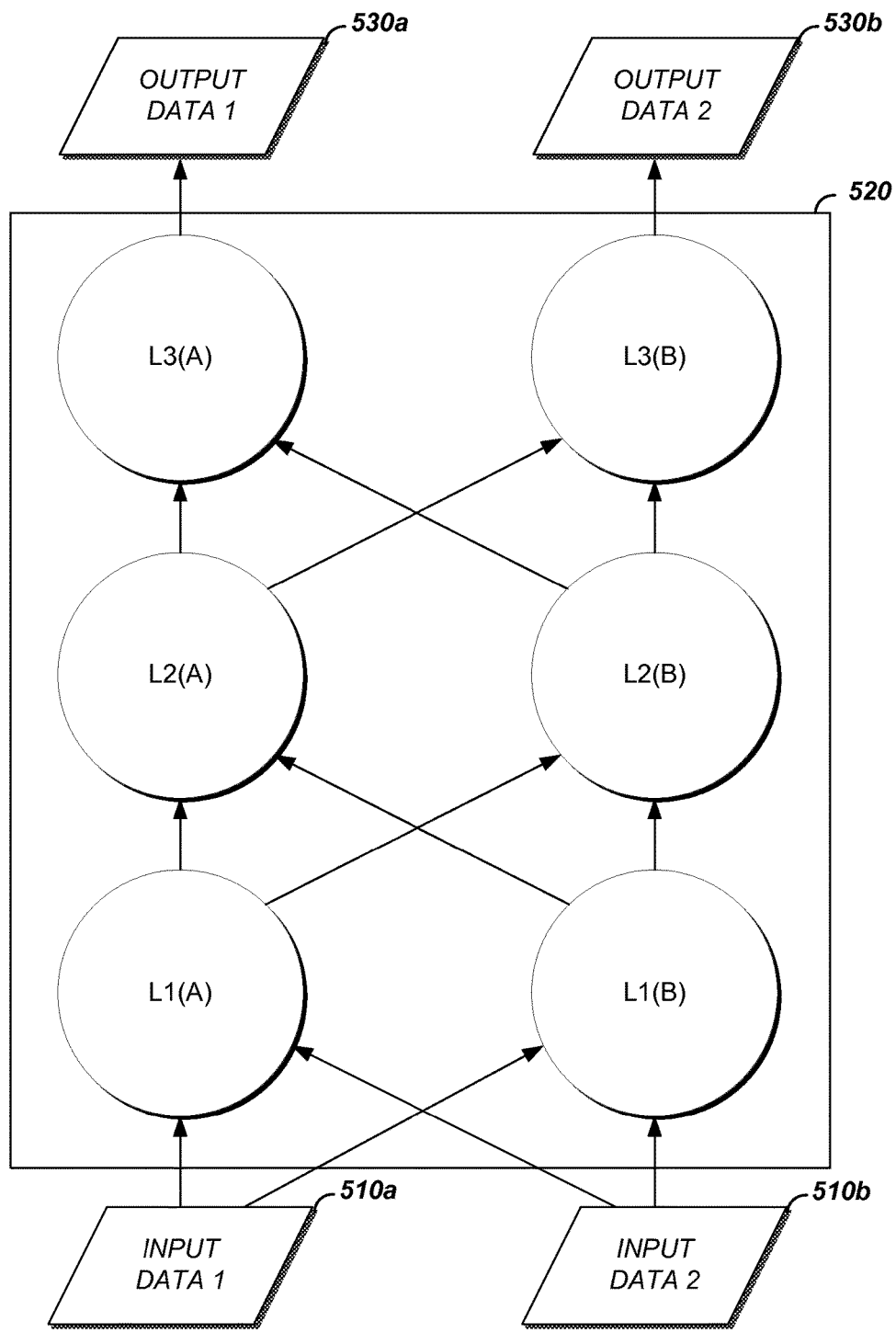
FIG. 5 is a node diagram illustrating an example neural network.

FIG. 5 is a node diagram illustrating an example neural network. The neural network model 520 includes six hidden nodes: two nodes at a first layer (L1(A) and L1(B)), two nodes at a second layer (L2(A) and L2(B)), and two nodes at a third layer (L3(A) and L3(B)). The neural network model 520 may be trained on input data such as input data 510*a* and input data 510*b*. The neural network model 520 shown in FIG. 5 provides two output data sets 530*a* and 530*b*. In some implementations, each layer may process over 100,000 parameter values. Furthermore, the model 520 shown includes three layers. However, the number of layers may be increased to 4, 5, 7, 12, or even 30 layers. To further emphasize the complexity of the models, the number of nodes at each layer is shown as being two in FIG. 5, but can be increased to factors of ten or one hundred in some implementations. The first layer including hidden nodes L1(A) and L1(B) may be referred to as the input receiving hidden node layer because this hidden node layer is the hidden node layer which first receives the input vector data provided to the model. The third layer including hidden nodes L3(A) and L3(B) may be referred to as the output producing hidden node layer because this hidden node layer is the hidden node layer which produces the output value for the model.

The lines connecting each node are each associated with a weight. The lines may be referred to as a path. Table 1 shows several path weights from the initial uncompressed model ("Uncompressed Model") through a compressed model ("L1 and L2 Compressed Model").

TABLE 1

| Path | Uncompressed Model | L1 Compressed Model | L1 Compressed Trained Model | L1 and L2 Compressed Model |
|---|---|---|---|---|
| L1(A)-L2(A) | 1.42766039 | 1.42767 | 1.42767 | 1.42767 |
| L1(A)-L2(B) | 9.77293473 | 9.77293 | 9.77293 | 9.77293 |

TABLE 1-continued

| Path | Uncompressed Model | L1 Compressed Model | L1 Compressed Trained Model | L1 and L2 Compressed Model |
|---|---|---|---|---|
| L1(B)-L2(A) | 3.24907847 | 3.24908 | 3.24908 | 3.24908 |
| L1(B)-L2(B) | −1.2304965 | −1.23050 | −1.23050 | −1.23050 |
| L2(A)-L3(A) | 7.35423689 | 7.35423689 | 7.41397593 | 7.4 |
| L2(A)-L3(B) | 0.70838112 | 0.70838112 | 0.70846130 | 0.7 |
| L2(B)-L3(A) | −2.39547741 | −2.39547741 | −2.3977777 | −2.4 |
| L2(B)-L3(B) | 4.22847657 | 4.22847657 | 4.24947503 | 4.2 |

As shown in Table 1, the initial weights are specified using eight decimal places. The compression for the model of FIG. 5 identified the first layer (L1) for compression first. Accordingly, the third column ("L1 Compressed Model") of Table 1 shows the compressed weights for the paths between the first layer (L1) and the second layer (L2). The compression method applied was to reduce the number of decimal places represented by the weight. This may be implemented as a conversion of the format used to represent the weight such as from floating point to fixed point decimal. It should be noted that during the compression of L1-L2 weights, the weights for L2-L3 are unchanged.

Having compressed the weights for L1-L2, the model is trained again. The resulting weights are shown in the fourth column ("L1 Compressed Trained Model") of Table 1. The weights of the compressed layer (L1-L2) are fixed while the weights of the uncompressed layers are updated. This avoids propagation of error after compression, making the model error tolerant.

The fifth column ("L1 and L2 Compressed Model") of Table 1 shows the compression of L2-L3 weights. It will be noted that the compression method used for L2-L3 weights is different than the compression used for L1-L2. As discussed above, the compression methods may be layer specific.

The described methods may increase the time needed to train the model since the model is initially trained using the full system resource in an unquantized fashion, and then again after compressing each layer of the model. However, the performance gains are sufficient to provide a beneficial reduction in errors due to quantization of the model to make the trade-off favorable for some implementations.

One non-limiting advantage of the error tolerant compression features described is that the compressed model requires a fewer resources than the uncompressed model. For example, the compressed model may require less memory to store than the uncompressed version. As another example, the compressed model may require less bandwidth to transmit than the uncompressed version. As yet another example, the compressed model may be executed more efficiently by a target system, such as an ASR system, than the uncompressed version. The efficiency may be measured by the amount of processing needed to obtain a prediction from the model. The amount of processing may be indicated by, for example, a number of processor cycles, a quantity of memory used, or a duration of time used to obtain a result from the model. Another non-limiting advantage of the features described is that the compression avoids degrading the accuracy of the compressed model.

One example implementation of a device for error tolerant speech recognition neural network model compression may include a computer-readable memory storing executable instructions and a physical computer processor in data communication with the memory. The physical computer processor may be programmed by the executable instructions to perform the methods described. For example, the instructions, when executed by the processor, may cause the device to receive a speech recognition neural network model, the speech recognition neural network model including a plurality of hidden node layers, each hidden node layer including at least one hidden node, the speech recognition neural network stored in a first quantity of memory. The instructions may also cause the device to select a specific hidden node layer from the hidden node layers and quantize the weights for inputs to the hidden nodes included in the identified hidden node layer. The quantization of the weights may include generating a quantized model by replacing weights quantize weights for inputs to the hidden nodes for the hidden node layer of the speech recognition neural network model with quantized weights, wherein a quantized weight for an input is generated using the weight for the input. Upon quantization, the neural network model may be stored in a quantity of memory that is less than the unquantized version of the model. After quantization of the inputs for the nodes of the hidden node layer, the quantized model may be trained using the quantized weights for the identified hidden node layer and the original training data set. The training may include fixing adjusting unquantized weights for inputs to hidden nodes of the quantized model such that the quantized model after adjustment is more accurate than the quantized model prior to adjustment.

The method described may be a computer-implemented method. Such an implementation may be performed under control of one or more computing devices configured with specific computer-executable instructions. The method may include obtaining a model from a storage device. A compression candidate layer may be identified for compression from amongst a set of layers included in the model. The weight values for the compression candidate layer may be compressed as discussed above. The model may then be trained using the compressed weight values for the compression candidate layer.

Figure 6:
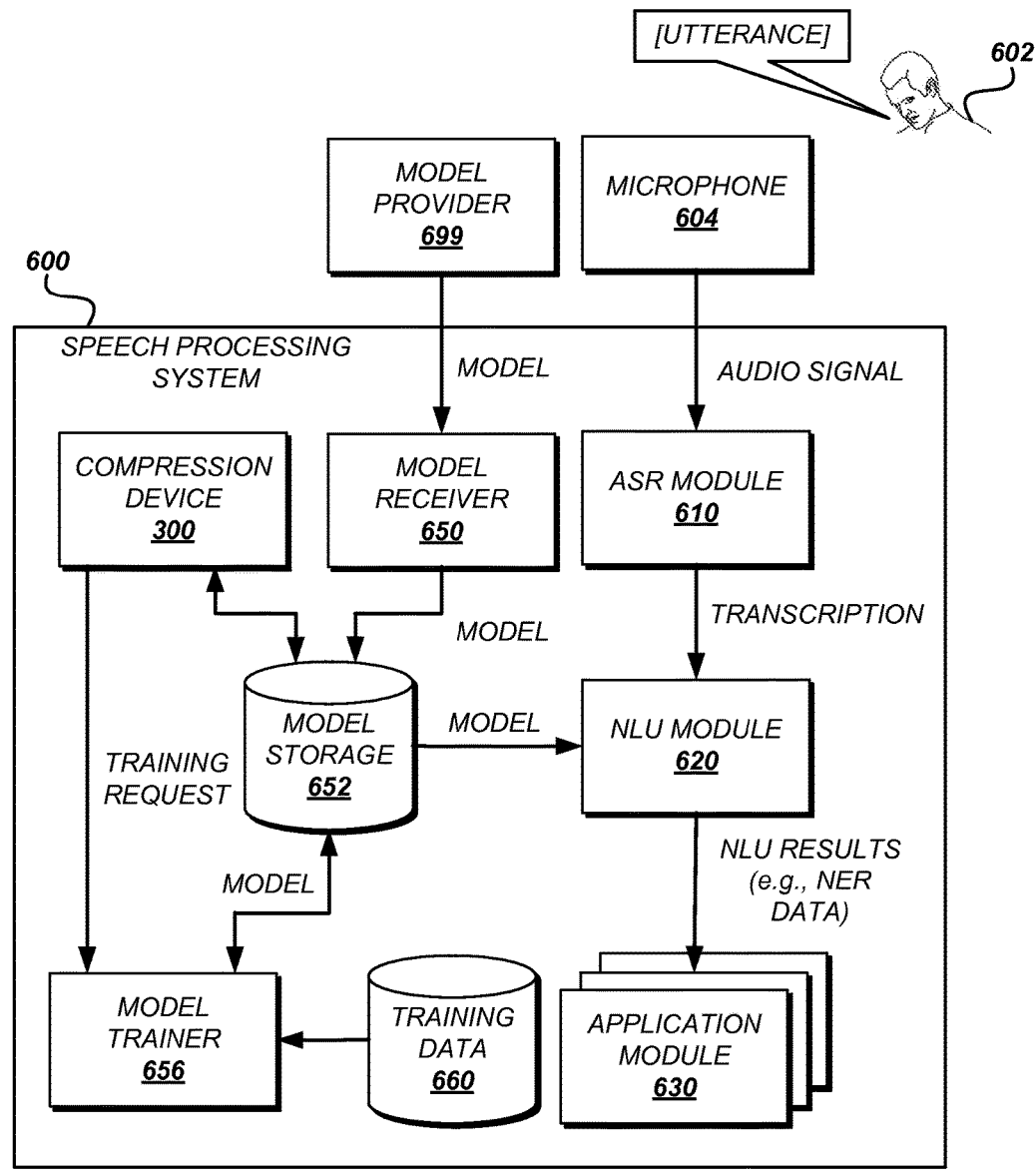
FIG. 6 is an illustrative computing system configured to use several of the error tolerant model training and compression features described.

FIG. 6 is an illustrative computing system configured to use several of the error tolerant model training and compression features described. The speech processing system 600 may be coupled to or integrated with a microphone 604. For example, the speech processing system 600 features described herein may be provided by a computing device (such as any of the computing devices described below), a personal computing device, mobile computing device, wearable computing device, consumer computing device, etc. In some embodiments, the speech processing system 600 may be a single server computing device, or it may include multiple distinct server computing devices, logically or physically grouped together to collectively operate as a speech processing system 600. The modules and components of the speech processing system 600 can each be implemented as hardware or as a combination of hardware and software. In such cases, the audio signal (or data derived therefrom) may be transmitted to the speech processing system 600 via a network.

As shown, the speech processing system 600 may receive an audio signal generated by a microphone 604 (or multiple microphones). The microphone 604 may be a stand-alone microphone in communication with the speech processing system 600. In some embodiments, the microphone 604 may be coupled to or integrated with a wide variety of computing devices, including personal computing devices, terminal computing devices, laptop computing devices, tablet computing devices, electronic reader devices, mobile devices such as mobile phones, media players, handheld gaming devices, or the like, wearable devices with network access and program execution capabilities such as "smart watches," "smart eyewear," "smart shoe," or the like, wireless devices, set-top boxes, gaming consoles, entertainment systems, televisions with network access and program execution capabilities such as "smart TVs", and various other electronic devices and appliances.

The speech processing system 600 can process the audio signal and perform various computing tasks using an ASR module 610, a natural language understanding ("NLU") module 620, various application modules 630, and the like. For example, the audio signal may include audio of an utterance made by a user 602, and the speech processing system 600 may use the ASR module 610 to generate a transcription of the utterance. The speech processing system 600 may then use the NLU module 620 to determine the user's intent and select an action to take in response to the utterance. The speech processing system 600 may then use an application module 630 to carry out the selected action. The example modules and components shown in FIG. 6 are illustrative only, and are not intended to be limiting. In some embodiments, the speech processing system 600 may include additional, fewer, and/or alternative modules or components.

In one non-limiting example, the NLU module 620 may use a model such as a neural network model, to generate results such as named entity recognition ("NER") in which words and phrases are labeled as particular entities (e.g., people, places, organizations, etc.) by extracting features from a text, such as the transcription received from the ASR module 610. The extraction may be performed as predictions from neural network model. Features extracted from the transcription may be provided as inputs to the model which then generates the NLU results.

As shown in FIG. 6, a model provider 699 may provide a model to the speech processing system 600. The model may be provided via a wired or wireless means such as via a network, a device in communication with the speech processing system such as an attached storage device or coupled storage device. A model receiver 650 is configured to receive the model from the model provider 699 and store it in a model storage 652. The model receiver 650, in some implementations, may perform pre-processing on the model such as format conversion or decryption. The model receiver 650 may also generate a compression flag for the received model indicating whether the model is of suitable size. The size may be determined by the resources needed to use or store the model as described above. The compression flag may be stored in the model storage 652 in association with the model. The compression flag may be used to identify models which need compressing.

The compression device 300 may be included to compress models identified as needing compression. In some implementations, the compression device 300 may be configured to monitor the model storage 652 for models flagged for compression. In some implementations, a separate process or module may be included to identify and initiate compression of a model. The compression device 300 may be implemented similar to that described in reference to FIG. 3. Once a layer is compressed, the compression device 300 may transmit a training request to a model trainer 656 included in the speech processing system 600. The trained and compressed model may then be stored in the model storage 652. The NLU module 620 may obtain the compressed model to process transcriptions as described.

The implementation shown in FIG. 6 illustrates how custom error tolerant compression may be provided in systems which use models such as neural network models. In some implementations, the compression device 300 may be implemented as a custom quantizer configured to compress the provided models to the specifications of the system in which the custom quantizer is included. Although FIG. 6 uses the speech processing system 600 as the example, other systems which use models capable of compression may compress in an error tolerant fashion while maintaining accuracy.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations, or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a compression device. The compression device may include a digital signal processor (DSP), an application specific integrated circuit (ASIC), a field programmable gate array (FPGA), a microprocessor, a controller, microcontroller, or other programmable logic element, discrete gate or transistor logic, discrete hardware components, or any combination thereof. Such compression devices are specially designed to perform the reverberation removal described herein. A compression device may include electrical circuitry configured to process specific computer-executable compression instructions to perform the model compressing described herein. In embodiments where the compression device includes a FPGA or similar programmable elements, the compression device may provide model compression without processing computer-executable instructions but instead by configuring the FPGA or similar programmable element to perform the recited features. Although described herein primarily with respect to digital technology, a compression device may also include primarily analog components. For example, some or all of the model compression described herein may be implemented in analog circuitry or mixed analog and digital circuitry.

The elements of a method, process, routine, or algorithm described in connection with the embodiments disclosed herein can be embodied directly in compression hardware, in a software module executed by a compression device, or in a combination of the two. A model compression software module can reside in RAM memory, flash memory, ROM memory, EPROM memory, EEPROM memory, registers, hard disk, a removable disk, a CD-ROM, or similar form of a non-transitory computer-readable storage medium. An exemplary storage medium can be coupled to the compression device such that the compression device can read information from, and write information to, the storage medium. In the alternative, the storage medium can be integral to the compression device. The compression device and the storage medium can reside in an ASIC. The ASIC can reside in a device configured to train neural network models or utilize such models to process audio data or image data such as a smartphone, a set-top-box, a tablet computer, a speech processing server, a recommendation server, an image identification server, or the like. In the alternative, the compression device and the storage medium can reside as discrete components in a device configured to compress model information before, during, or after transmission.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof such as X, Y, and/or Z. Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for transmitting information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A device for error tolerant speech recognition neural network model compression, the device comprising:
   computer-readable memory storing executable instructions;
   one or more physical computer processors in communication with the computer-readable memory, wherein the one or more physical computer processors are programmed by the executable instructions to at least:
   receive a speech recognition neural network model, the speech recognition neural network model including a plurality of hidden node layers, each hidden node layer including at least one hidden node, each hidden node configured to:
      receive one or more input values;
      multiply the one or more input values by respective weight values to determine respective weighted input values; and
      sum the respective weighted input values to generate an output value for the hidden node, the speech recognition neural network model generated using a training data set comprising utterance data, the speech recognition neural network model stored using a first quantity of memory;

select a first hidden node layer from the plurality of hidden node layers for quantization;

receive a mapping identifying a reduced representation for a weight value for a node included in the first hidden node layer, the reduced representation being stored using a quantity of memory that is less than a quantity of memory used to store the weight value;

generate a quantized model by replacing the weight value for the node included in the first hidden node layer with the reduced representation identified in the mapping, wherein the quantized model is stored using a second quantity of memory that is less than the first quantity of memory;

replace a weight value of another node included in a second hidden node layer of the plurality of hidden node layers with an updated weight value until a prediction accuracy of the quantized model corresponds to a target model accuracy;

receive audio data of an utterance;

generate a speech recognition result using the quantized model and the audio data, wherein the quantized model generates the speech recognition result using fewer resources than the speech recognition neural network model generates a result using the audio data; and adjust, via an application module, the device to perform an action based at least in part on the speech recognition result.

2. The device of claim 1, wherein the instructions to select the first hidden node layer further comprise instructions to one or more of:

select a lowest layer as the first hidden node layer, wherein the lowest layer is an unquantized model hidden layer to generate an output value before any other unquantized model hidden layer;

select a highest layer as the first hidden node layer, wherein the highest layer is an unquantized model hidden layer to generate an output value after all other unquantized model hidden layers have generated output values; or compare first memory requirements for storing reduced representations of weight values for a first hidden node layer with second memory requirements for storing reduced representations of weight values for a second hidden node layer to select the first hidden node layer as the hidden node layer when the first memory requirements are less than the second memory requirements.

3. A device comprising:

computer-readable memory storing executable instructions;

one or more physical computer processors in communication with the computer-readable memory, wherein the one or more physical computer processors are programmed by the executable instructions to at least:

obtain a neural network model from a storage device, the model including a plurality of node layers, each node layer of the plurality of node layers including at least one node, each node configured to:

receive one or more input values; and generate an output value for the node using the one or more input values and respective weight values for the one or more input values, the neural network model having a first required resource quantity to store or use the neural network model;

select a candidate node layer, of the plurality of node layers of the model, for compression;

receive a mapping identifying a reduced representation for a weight value for a node included in the candidate node layer, the reduced representation being stored using a quantity of memory that is less than a quantity of memory used to store the weight value;

generate a compressed model by replacing the weight value for the node included in the candidate node layer with the reduced representation identified in the mapping, the compressed model having a second required resource quantity to store or use the compressed model that is less than the first required resource quantity;

replace a weight value of a node included in a first uncompressed hidden node layer of the plurality of hidden node layers with an updated weight value until a prediction accuracy of the compressed model corresponds to a target model accuracy;

receive audio data of an utterance; and generate a speech recognition result using the compressed model and the audio data, wherein the compressed model generates the speech recognition result using fewer resources than the neural network model generates a result using the audio data.

4. The device of claim 3, wherein the instructions to select the candidate node layer comprises instructions to receive an identifier for one of a plurality of level selection methods, the plurality of level selection methods including at least one of:

select a lowest layer of the neural network model as the candidate node layer, wherein the lowest layer is an uncompressed model layer to generate an output value before any other uncompressed model layer;

select a highest layer of the neural network model as the candidate node layer, wherein the highest layer is an uncompressed model layer to generate an output value after all other uncompressed model layers have generated output values; or compare first resource requirements for a resource to use or store reduced representations of weight values for a first model layer with second resource requirements for the resource to use or store reduced representations of weight values for a second model layer to select the first model layer as the candidate layer when the first resource requirements are less than the second resource requirements.

5. The device of claim 3, wherein the mapping identifies a set of quantized weight values, and wherein the one or more physical computer processors are programmed by the executable instructions to at least:

identify one of a set of quantized weight values as the reduced representation for the weight value, wherein the identifying uses a quantized weight value included in the set of quantized weight values having a lowest magnitude of difference from the weight value as compared to any other quantized weight value of the set of quantized weight values.

6. The device of claim 3, wherein the mapping identifies a rounding precision identifying a quantity of information to include in reduced representations of weight values, and wherein the one or more physical computer processors are programmed by the executable instructions to at least:

generate the reduced representation using the weight value for the node of the candidate node layer, wherein the weight value is adjusted according to the rounding precision.

7. The device of claim 3, wherein the mapping identifies a format conversion for generating reduced representations of weight values, and wherein the one or more physical computer processors are programmed by the executable instructions to at least:
generate the reduced representation using the weight value for the node, wherein the weight value is adjusted according to the format conversion.

8. The device of claim 3, wherein the one or more physical computer processors are programmed by the executable instructions to at least:
receive a compression termination condition identifying when compression of the neural network model is complete;
determine whether, after replacing the weight value, the compression termination condition has occurred; and
if the compression termination condition has not occurred:
select a second candidate node layer for compression;
generate a second compressed model by replacing weight values for inputs to the nodes of the second candidate node layer with reduced representation identified in the mapping; and
replace a weight value from a node included in a third hidden node layer of the plurality of hidden node layers with an updated weight value until the prediction accuracy of the second compressed model corresponds to the target model accuracy, wherein the second uncompressed hidden node layer is different from the candidate node layer and the second candidate node layer and the first uncompressed hidden node layer.

9. The device of claim 3, wherein the one or more physical computer processors are programmed by the executable instructions to at least:
determine an amount of adjusting to perform for the weight value using a comparison of an expected output value for the node for a training data set processed by the compressed model with an obtained output value for the node for the training data set processed by the compressed model; and
generate the updated weight value based at least in part on the amount of adjusting.

10. The device of claim 3, wherein the one or more physical computer processors are programmed by the executable instructions to at least receive a training termination condition, the training termination condition including a target model accuracy, wherein the replacing of the weight value is performed until the training termination condition is detected.

11. A computer-implemented compression method comprising:
under control of one or more computing devices configured with specific computer-executable instructions,
obtaining a neural network model from a storage device, the model including a plurality of node layers, each node layer of the plurality of node layers including at least one node, each node configured to:
receive one or more input values; and
generate an output value for the node using the one or more input values and respective weight values for the one or more input values,
the neural network model having a first required resource quantity to store or use the neural network model;
selecting a candidate node layer, of the plurality of node layers of the model, for compression;
receiving a mapping identifying a reduced representation for a weight value for a node included in the candidate node layer, the reduced representation being stored using a quantity of memory that is less than a quantity of memory used to store the weight value;
generating a compressed model by replacing the weight value for the node included in the candidate node layer with the reduced representation identified in the mapping, the compressed model having a second required resource quantity to store or use the compressed model that is less than the first required resource quantity;
replacing a weight value of a node included in a first uncompressed hidden node layer of the plurality of hidden node layers with an updated weight value until a prediction accuracy of the compressed model corresponds to a target model accuracy;
receiving audio data of an utterance; and
generating a speech recognition result using the compressed model and the audio data, wherein the compressed model generates the speech recognition result using fewer resources than the neural network model generates a result using the audio data.

12. The computer-implemented method of claim 11, wherein selecting the candidate layer includes receiving an identifier for one of a plurality of level selection methods, the plurality of level selection methods including at least one of:
selecting a lowest layer of the neural network model as the candidate node layer, wherein the lowest layer is an uncompressed model layer to generate an output value before any other uncompressed model layer;
selecting a highest layer of the neural network model as the candidate node layer, wherein the highest layer is an uncompressed model layer to generate an output value after all other uncompressed model layers have generated output values; or
comparing first resource requirements for a resource to use or store reduced representations of weight values for a first model layer with second resource requirements for the resource to use or store reduced representations of weight values for a second model layer to select the first model layer as the candidate layer when the first resource requirements are less than the second resource requirements.

13. The computer-implemented method of claim 12, wherein the mapping identifies a set of quantized weight values, and wherein the method comprises: identifying one of a set of quantized weight values as the compressed weight value for a weight for an input value to a node included in the candidate node layer, wherein the identifying uses a quantized weight value included in the set of quantized weight values having a lowest magnitude of difference from the weight value as compared to any other quantized weight value of the set of quantized weights.

14. The computer-implemented method of claim 12, wherein the mapping identifies a rounding precision identifying a quantity of information to include in reduced representations of weight values, and
wherein the method comprises: generating the reduced representation using the weight value for the node of the candidate node layer, wherein the weight value is adjusted according to the rounding precision.

15. The computer-implemented method of claim 12, wherein the mapping identifies a format conversion for generating reduced representations of weight values, and wherein the method comprises generating the reduced representation using the weight value for the node, wherein the weight value is adjusted according to the format conversion.

16. The computer-implemented method of claim 11, further comprising:
   obtaining a compression termination condition identifying when compression of the neural network model is complete;
   determining whether, after replacing the weight value, the compression termination condition has occurred; and
   if the compression termination condition has not occurred:
      selecting a second candidate node layer for compression;
      generating a second compressed model by replacing weight values for inputs to the nodes of the second candidate node layer with reduced representation identified in the mapping; and
      replacing a weight value from a node included in a third hidden node layer of the plurality of hidden node layers with an updated weight value until the prediction accuracy of the second compressed model corresponds to the target model accuracy, wherein the second uncompressed hidden node layer is different from the candidate node layer and the second candidate node layer and the first uncompressed hidden node layer.

17. The computer-implemented method of claim 11, further comprising determining an amount of adjusting to perform for the weight value using a comparison of an expected output value for the node for a training data set processed by the compressed model with an obtained output value for the node for the training data set processed by the compressed model; and
   generating the updated weight value based at least in part on the amount of adjusting.

18. The computer-implemented method of claim 11, further comprising obtaining a training termination condition, the training termination condition including a target model accuracy, wherein the replacing of the weight value is performed until the training termination condition is detected.

19. The computer-implemented method of claim 12 further comprising:
   selecting an application module to initiate an action responsive to the speech recognition result; and
   adjusting, via the application module, a device to perform the action based at least in part on the speech recognition result.

* * * * *